United States Patent [19]

Morrison

[11] 4,349,364
[45] Sep. 14, 1982

[54] MULTIPLE ORIFICE BUSHING

[75] Inventor: Michael W. Morrison, Newark, Ohio

[73] Assignee: Owens-Corning Fiberglas Corporation, Toledo, Ohio

[21] Appl. No.: 316,244

[22] Filed: Oct. 29, 1981

[51] Int. Cl.$^3$ .......................................... C03B 37/025
[52] U.S. Cl. ............................................. 65/2; 65/12
[58] Field of Search ................................... 65/1, 2, 12

[56] References Cited

U.S. PATENT DOCUMENTS

| | | | |
|---|---|---|---|
| 2,846,157 | 8/1958 | Stephens et al. | 65/1 |
| 3,905,790 | 9/1975 | Strickland | 65/2 |
| 4,032,314 | 6/1977 | Coggin | 65/1 |
| 4,222,757 | 9/1980 | Glaser et al. | 65/2 |
| 4,274,855 | 6/1981 | Russell | 65/2 |

FOREIGN PATENT DOCUMENTS 736098  6/1943  Fed. Rep. of Germany ............ 65/1

Primary Examiner—Robert L. Lindsay, Jr.
Attorney, Agent, or Firm—R. C. Hudgens; Philip R. Cloutier

[57] ABSTRACT

A process for manufacturing glass filaments in which the bushing bottom plate has tips depending therefrom and each tip has a plurality of orifices from which glass filaments are drawn. The tips flood individually on start-up or during operation, and the flood results in a single composite filament being formed from the orifices of that tip. The composite filament beads down rapidly and is subsequently separated into individual filaments by the use of a fluid spray directed against the composite filament at the tip lower face. The fluid spray is utilized to momentarily quench the composite filament and is terminated once separation occurs. Subsequent filament drawing is accomplished without the use of a cooling fluid and by the use of known heat exchange means, e.g., a flow of cooling gas.

10 Claims, 7 Drawing Figures

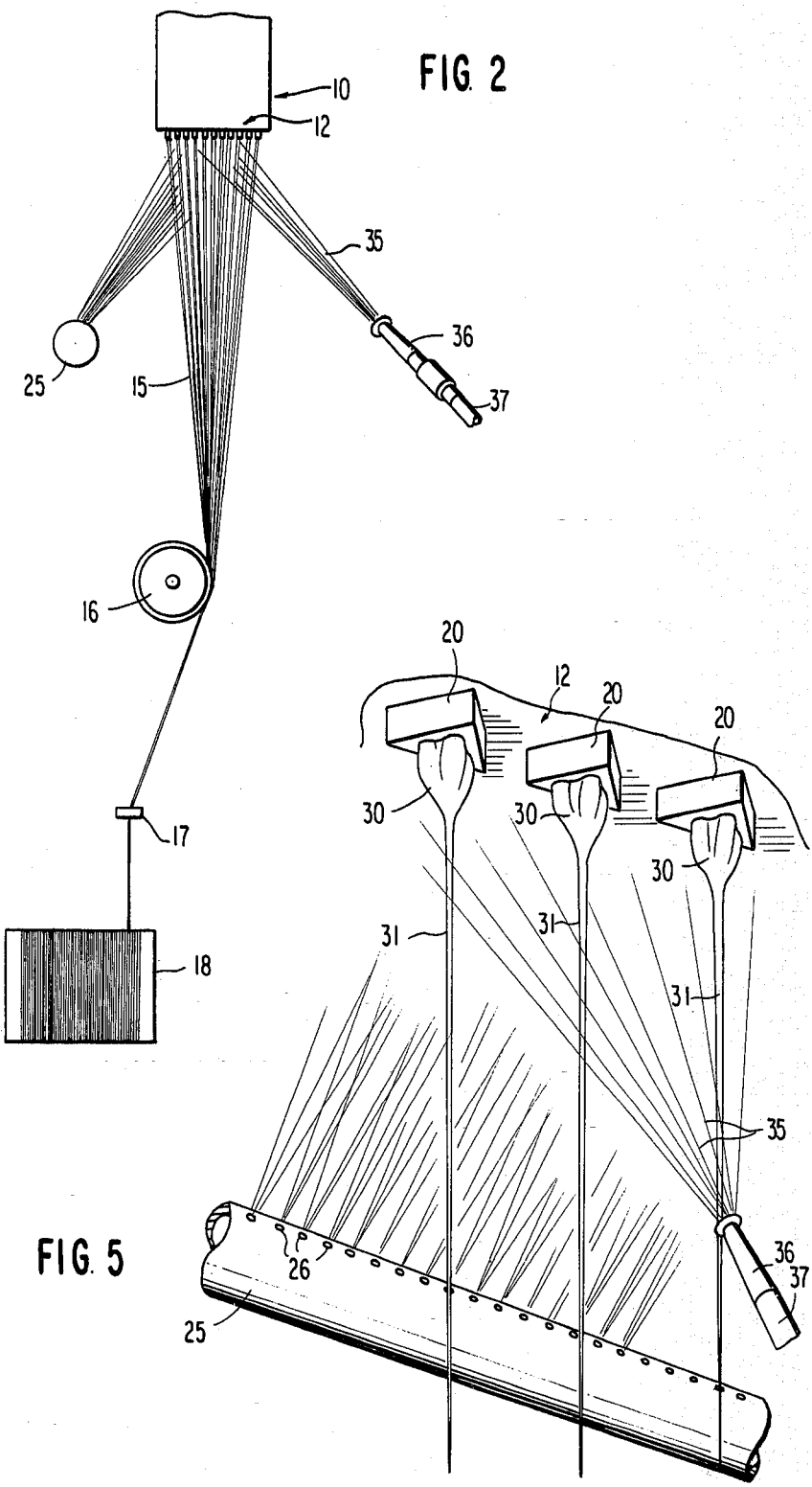

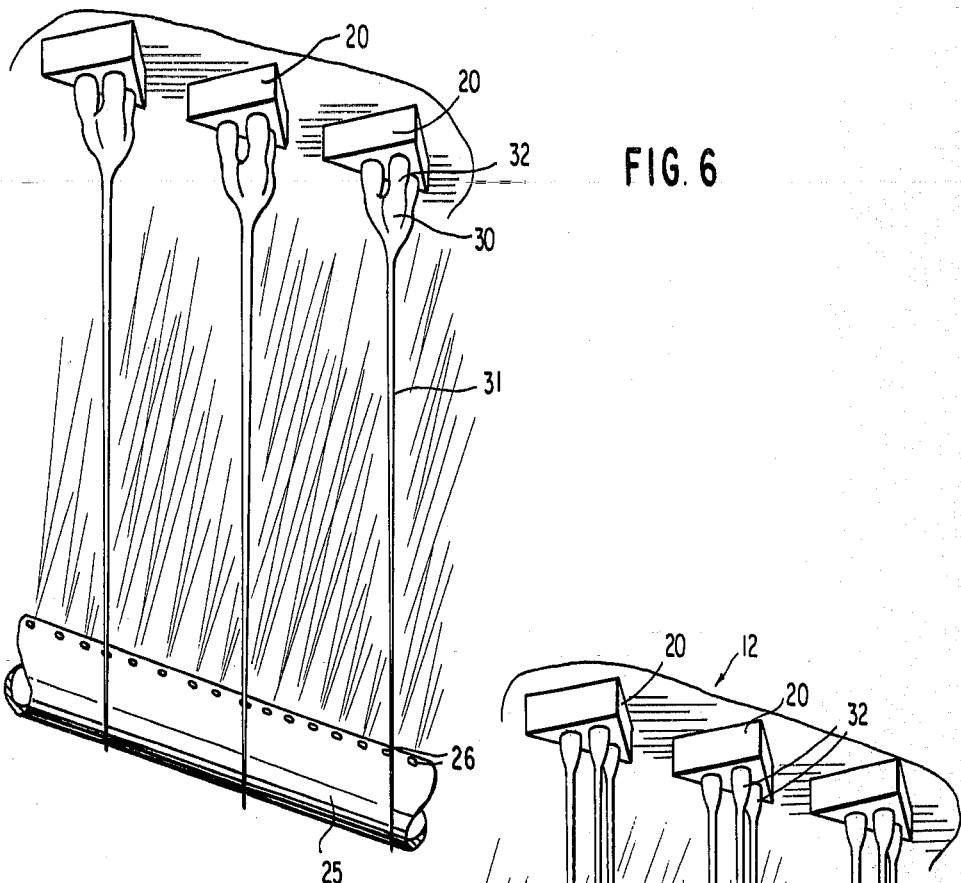
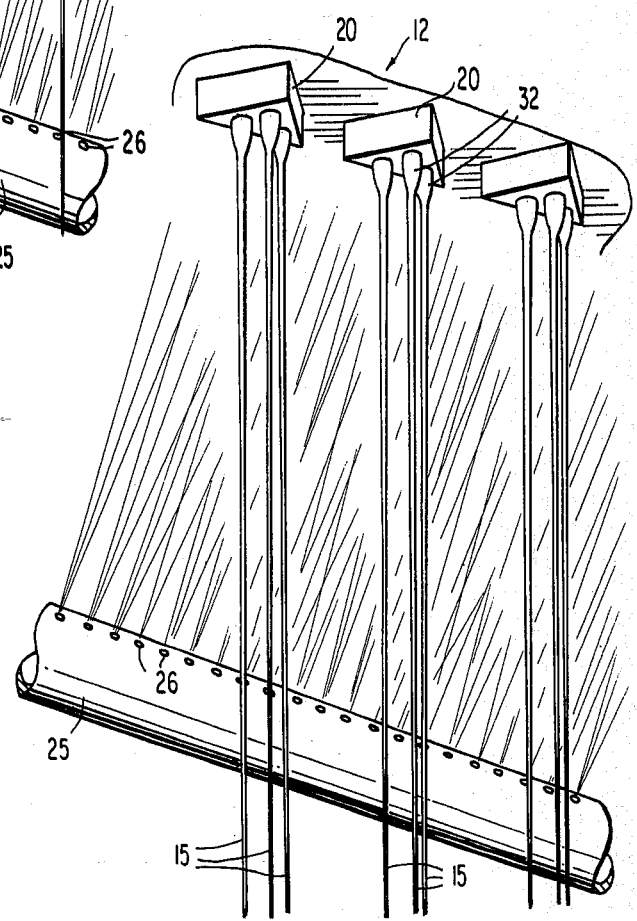

MULTIPLE ORIFICE BUSHING

TECHNICAL FIELD

The present invention relates to an apparatus and a method for manufacturing continuous glass filaments by the drawing of molten glass through apertures, or orifices, located in the bottom plate of a bushing, or feeder, containing a body of molten glass. The glass flowing through the orifices forms a cone beneath each orifice, and a filament is drawn from each cone by a winder located beneath the bushing. Heat exchange means, e.g., a flow of cooling air, or a fin shield arrangement, is utilized to stabilize the cones and to prevent flooding of molten glass across the bottom of the orifice plate.

Recent developments in bushing technology have made possible the provision of a very large number of orifices in the bushing bottom plate, e.g., on the order of 50 to 200 orifices per square inch (7.64 to 3.10) orifices per square centimeter). Also, recent developments have made feasible the production of extremely small filaments, e.g., on the order of 0.0001 to 0.0002 inches (0.000254 to 0.000508 centimeter) in filament diameter. In starting a bushing or in re-starting a bushing after flooding has occurred the molten glass usually flows by gravity through the orifices as streams that are attenuated by secondary means, such as pull rolls, and gathered together as a strand. Generally, where extremely small filaments are being manufactured, the molten glass flows very slowly by gravity through the minute orifices, and a considerable period of time elapses before a sufficient strand can be accumulated for initiation of the winding operation. The accumulation time necessary for winder operation initiation is known in the art as the "bead drop time."

There is a need in the art for a practical, trouble-free method of initiating filament winding when starting a bushing or when clearing a flooded bushing. This need is particularly pressing in the manufacture of fine filaments, where the bead drop time is excessive.

DISCLOSURE OF INVENTION

The present invention provides a new and novel approach to the problem of initiation of continuous glass filament production from a multitude of orifices formed in a bushing bottom plate.

More particularly, the present invention employs a plurality of "tips" or depending protrusions or projections on the underside of the bushing bottom plate, and each of these tips is provided with a plurality of orifices which are so closely spaced as to normally "flood" during initiation of the filament-forming operation. Each tip provides a plurality of orifices, preferably from about two to about seven, which are isolated from the orifices provided in adjacent tips, and the orifices of each single tip are grouped together so as to be in flooding relation with one another.

As a result, upon flooding of the bushing, a single relatively large globule of molten glass is formed at the lower surface of each tip, but the globules at adjacent tips do not merge or agglomerate with one another. This relatively large globule of molten glass at each tip is formed by the molten glass flowing through each of the plurality of orifices at that individual tip, and the mass of this globule is such that it will drop down rapidly by gravity to form a single filament. This filament is attenuated from a relatively large single stream of molten glass issuing from all the orifices of the tip.

The operator divides the relatively large single stream at each tip to form individual component filaments, i.e., one filament per orifice, by impinging a coolant liquid, such as water, on the single glass stream at the face of the tip, i.e., as the molten glass streams issue in merged relationship from the several orifices as one relatively large stream. The liquid sprayed onto the molten glass in the filament forming region acts as a heat exchange or quenching medium which chills the molten glass drastically but momentarily. The liquid, preferably at ambient temperature, is sprayed directly onto the body of molten glass and can be immediately turned into vapor as the glass is quenched.

As a result, the drastic quenching separates the relatively large glass stream into individual component molten glass cones at each orifice of the tip. Once the individual cones have formed at the individual orifices, continued operation of the winder will draw an individual filament from each cone, and filament separation is accomplished. During the initial flooding of individual multi-orifice tips, the formation of the initial larger single stream at each multi-orifice tip, and the initial drawing of the coarse filament from the larger stream, the normal heat exchange components of the bushing function in their normal, conventional manner, i.e., a cooling fluid, such as air, is directed upwardly at the bushing bottom or conventional fin shields are utilized for the primary heat exchange operation. The utilization of the liquid quench is momentary, and its use is intended solely as the means for separating each of the composite filaments into its component individual filaments formed at each orifice. Once separation has been accomplished, the liquid quench is discontinued and normal bushing operation is established.

The invention, then, has two applications both related to the establishment of fiber flow from a bushing. In the first, the start-up procedure, a gaseous fluid is continuously impinged upon the orifice tips. A cooling liquid is simultaneously impinged upon the orifice tips and orifice plate but only for a period sufficient to separate the composite filament from each tip into individual filaments from each of the plurality of orifices of the tip. Having achieved the separation, the impingement of the cooling fluid on the orifice tips and plate is discontinued but the impingement of the gaseous fluid is continued.

In the second, the reestablishment of filament formation after a breakout which causes the flow from the individual orifices to merge and flow as a single filament from a multi-orificed tip, the procedure is comparable. The gaseous fluid will be continuously impinged upon the tips during the breakout. Upon breakout, the cooling liquid is simultaneously impinged upon the orifice tips and orifice plate as previously described, the flow of the cooling liquid being discontinued after individual flow from each orifice is established.

Any suitable material can be employed as the continuously impinged gaseous fluid. Such gaseous fluids include air, carbon dioxide, nitrogen and the like.

Any suitable material can be employed as the cooling liquid quench. Suitable cooling liquids are water, aqueous diethylene glycol, glycerine and non-flammable liquids in general. It is also suitable to utilize refrigerated fluids such as refrigerated carbon dioxide, nitrogen air, and the like, in the gaseous state, the fluid having a sufficiently high specific heat or being at a sufficiently low temperature to cause the combined fibers from the plurality of orifices of a single tip to contract and form individual filaments from each individual orifice of the single tip.

The substantial reduction in bead drop time will be appreciated, since the initial molten glass globule is relatively massive and drops quickly by gravity trailing the composite filament behind it. Further, the utilization of multi-orificed tips increases the number of orifices which can be provided, while any transient or non-start-up flooding is localized by the geometry and spacing of the tips. Any transient, localized flooding can be cured in the same manner, i.e., by directing a stream of liquid on the specific flooded tip to immediately effect separation of the component filament into its individual component filaments.

BRIEF DESCRIPTION OF DRAWINGS

FIG. 2 is a schematic view, seen in end elevation, of the arrangement of FIG. 1;

FIG. 5 is a somewhat schematic view of the arrangement of FIGS. 1 and 2 looking upwardly toward the bushing bottom plate; and FIGS. 6 and 7 are schematic views similar to FIG. 5 illustrating subsequent phases in the operation of the process of the present invention.

BEST MODE FOR CARRYING OUT THE INVENTION

Figure 1:
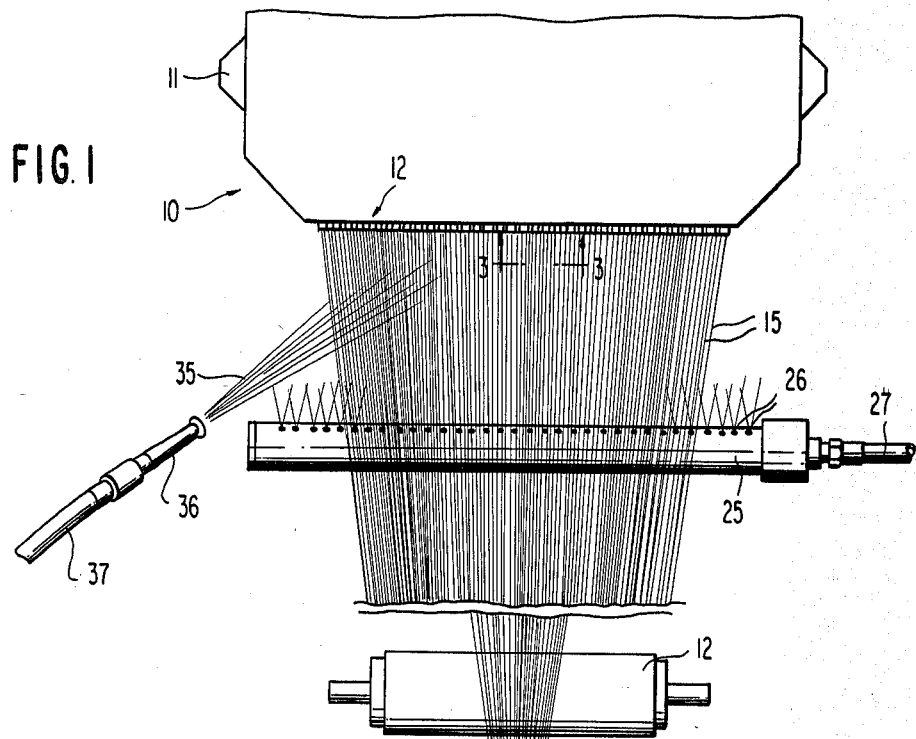
FIG. 1 is a schematic representation, viewed in side elevation, of a glass filament bushing and drawing arrangement incorporating the present invention.

As best shown in FIGS. 1 and 2, reference numeral 10 refers generally to a bushing of well known type for containing a body of molten glass, the glass in the bushing being retained in a molten state by means of a heating current applied through the conventional ears or electrical terminals 11. The molten glass in the bushing overlies a bushing bottom plate 12 which is apertured to provide orifices through which continuous glass filaments 15 are drawn downwardly, the filaments passing over a sizing applicator roll 16 and through a gathering shoe 17 to be wound upon the mandrel 18 of a conventional winder. The winder attenuates the filaments by drawing them from molten glass cones formed at the orifices of the bushing bottom plate.

Figure 3:
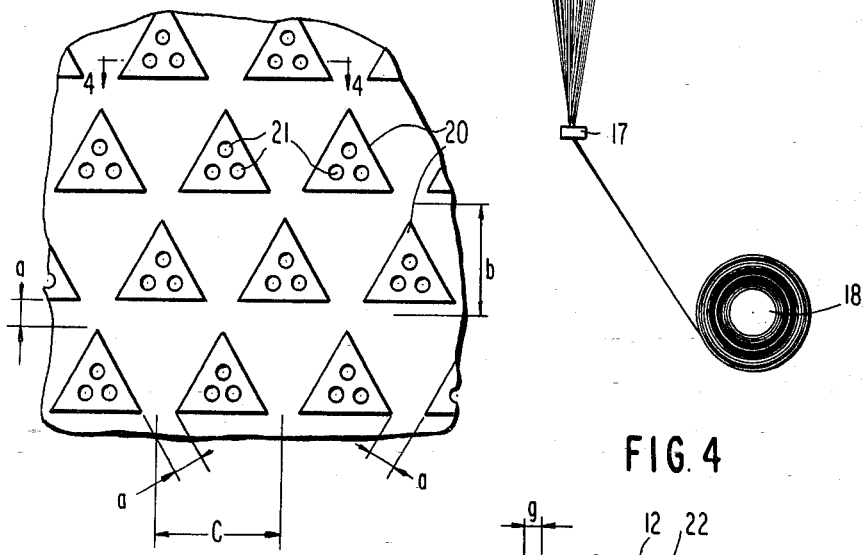
FIG. 3 is a greatly enlarged sectional view taken along the plane 3—3 of FIG. 1.
Figure 4:
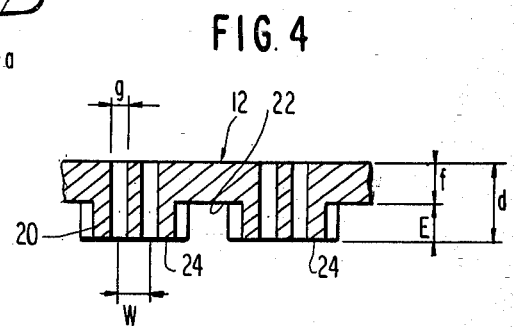
FIG. 4 is a further enlarged sectional view taken along the plane 4—4 of FIG. 3.

The specific bushing bottom plate embodying one specie of the present invention is illustrated in FIGS. 3 and 4. The bottom plate 12 is provided with a plurality of polygonal embossments or "tips" 20 thereon, each tip being preferably in the form of an equilateral triangle, and each tip having a plurality of spaced apart orifices 21, preferably three in number, therein. The orifices are located centrally of each of the triangular tips.

The spatial arrangement between the tips and representative dimensions of such tips are illustrated in FIGS. 3 and 4. Preferably, the undersurface of the orifice plate 12 is machined, as by milling, to form slots 22 in the undersurface thereof, these slots subdividing the undersurface of the plate to provide the isolated tips 20.

In that embodiment illustrated in the drawings, the lateral and transverse distance between the adjacent tips, as indicated by the reference numeral A, is on the order of 0.0625 inch (0.15875 centimeter), and the center-to-center distances between the adjacent slots in the vertical direction of FIG. 3 is 0.219 inch (0.55626 centimeter), while the lateral distance, center-to-center is on the order of 0.253 inch (0.64262 centimeter). By making diagonal cuts A in two directions utilizing a 1/16 inch (0.15875 centimeter) cutter with a maximum permissible width of 0.70 inch (1.778 centimeter) and maintaining a horizontal cut spacing of 7/32 of an inch (0.555625 centimeter), as indicated by B, and a 60° cut spacing of about 0.253 inch (0.64262 centimeter) as indicated by the dimension C, a nominal 63 tips per square inch (9.765 tips per square centimeter) are obtained, although the necessary marginal space for supporting the plate 12 generally reduces the actual number of tips per square inch to on the order of 50 (7.75 per square centimeter).

As best illustrated in FIG. 4 of the drawings, the overall thickness of the plate 12, as indicated by the dimension D in the preferred embodiment, is about 0.130 inch (0.3302 centimeter), the depth of the grooves 22 and the height of the tips is on the order of 0.60 inch (1.524 centimeter) as indicated by the dimension E, and the dimension F is on the order of 0.070 inch (0.1778 centimeter). The three orifices 21 formed in each tip are drilled to a nominal dimension G of 0.037 inch (0.09398 centimeter) on centers, indicated by the dimension H, of from about 0.043 inch to 0.045 inch (about 0.10922 centimeter to 0.1143 centimeter).

In the preferred embodiment, utilizing the above dimensions, each tip is in the form of an equilateral triangle on the order of 0.190 inch (0.4826 centimeter) on each side, and each tip has a height dimension E of 0.60 inch (1.524 centimeter), with the three orifices located centrally above each tip in an appropriate triangular array.

While the preferred triangular configuration of the tips and the preferred dimensional relationship of the array of tips has been given in detail above, it should be understood that the present invention is limited to neither the configuration nor the dimensions of the preferred embodiment. The tips may be of square, rectangular, hexagonal, circular or any other shape which may be desired. The number of orifices per tip may vary from 2 to 7 or more, and the tips may be arranged in any geometric relation or any spacing which may be desired. The number of tips per square inch (square centimeter) and the number of orifices can be varied to provide a variable number of orifices, preferably ranging from about 50 to about 200 per square inch (from about 7.75 to about 3.10 per square centimeter). The height dimension E of the tips may also be varied, so that the tips may form either a minor portion of the complete thickness dimension D of the plate, or the tips may form the major portion of the vertical dimension D. Further, it is not necessary that the tips be spaced uniformly across the undersurface of the plate, and the tips may be grouped into subgroups to accommodate the provision of fin shields or other cooling apparatus.

For purposes of the present invention, it is only necessary that the tips have the following characteristics:

1. A plurality of isolated tips are provided across the undersurface of the orifice plate so that the tips, in effect, subdivide the bottom surface of the bottom plate into separate and distinct orifice locations; and 2. Each tip is provided with a plurality of orifices which are so closely spaced as to be in flooding relationship with one another; yet the orifices of each tip are isolated physically from the orifices of any other tip, as by the grooves.

As best seen in FIGS. 1, 2 and 5–7, an air manifold 25 is provided beneath the bushing plate at a location which is laterally displaced from the path of the filaments being drawn from the plate. This manifold is provided with a plurality of air outlet apertures 26 throuh which air introduced into the manifold from a suitable source, as through a supply line 27, is directed upwardly toward the undersurface of the plate. The length of the manifold and the arrangement of the air outlet apertures is such that the manifold directs a flow of cooling air upwardly toward the plate for controlled cooling of the glass cones in the fiber forming area. If desired, more than one manifold can be provided, or the manifold can be oscillated to sweep across the undersurface of the plate.

While the foregoing manifold is designed for the purpose of supplying air to flow upwardly toward the undersurface of the plate to control the fiber forming environment, other gaseous cooling media may be utilized as previously defined. In practice, it has been found that air under pressure is an adequate heat exchange medium and, of course, it is preferred for reasons of cost, ease of handling, non-flammability and the like.

The air, or other gaseous heat exchange medium, is provided at the plate in a volume, velocity, and temperature sufficient to cool the filaments being drawn from the individual orifices and sufficient to maintain a forming cone from which the filament is drawn at each orifice. During normal operating conditions, once the drawing of the glass filaments has been initiated and in the absence of flooding at any portions of the orifice plate, the flow of air is sufficient to maintain the continued separation of the filaments and to maintain stable forming cones at the individual orifices.

In starting the bushing, or at the time of flooding of any portion of the bushing, the condition comparable to that illustrated in FIG. 5 will occur. Under flooding conditions, individual forming cones are not formed at each of the orifices within an individual tip. Rather, molten glass will issue from each of the three orifices of each tip and merge together to form a massive, single, merged stream 30. The merged stream is actually a composite of the molten glass flowing through each of the individual orifices of each tip and merging across the face of each tip. A single coarse composite filament 31 can be drawn from each merged stream.

To separate the composite filaments into the individual glass filaments 15 drawn as individual streams from cones 32, a spray of liquid, such as water 35, issued from a nozzle 36 receiving water from a source through a hose 37 is manually directed against the massive conglomerate stream 30 issuing from each tip 20. Preferably, the water is at ambient temperature and the water sprayed onto the conglomerate stream acts as a heat exchange or quenching medium, chilling the mass drastically, so that the mass separates and individual filaments 15 are drawn from individual molten glass forming cones 32 (FIG. 7) issuing from each individual orifice of each tip. The initiation of this separation to form an individual cone at each orifice is indicated in FIG. 6 and the final separate filament formation is illustrated in FIG. 7. Once separation has been attained, the flow of water is terminated, and the drawing of fibers proceeds utilizing the normal air flow from manifold as the only cooling medium.

In the event of localized flooding, a stream of water is impinged on only those tips which are flooded to effect the separation of the flooded massive molten glass stream into the individual filaments as illustrated in FIG. 7.

It will be appreciated that the gravity flow of molten glass through extremely fine orifices is quite slow and that a considerable bead drop time is involved where extremely fine filaments are being manufactured. By merging the streams in from the individual orifices into the massive streams 30 of FIG. 5 and allowing these massive streams to drop from the individual tips or to draw composite filaments therefrom, also as illustrated in FIG. 5, a substantial reduction in the bead drop time is obtained. Thus, substantial time advantages will be obtained so long as it is possible to separate the massive composite fibers into their component filaments. This separation can be effected easily and quickly by the liquid impingement process of this invention.

EXAMPLE

A bushing having a total of 1,500 orifices and dimensioned in accordance with the dimensions A through H hereinbefore given and of the configuration illustrated in FIGS. 3 and 4 was utilized. At normal operating temperatures of 2300° F. (1260° C.) (the "bushing set point") and with the use of a double row air nozzle blowing upward at the bushing, a flooded bushing could not be cleared and individual filaments formed even with full air flow from the manifold and with the utilization of a conventional air lance.

Water was directed from a conventional 100° water spray nozzle at ambient temperature and at a three gallon per hour rate directly onto the massive composite molten glass streams as illustrated in FIG. 5. The water spray quickly cooled the glass and gave full fiber separation as illustrated in FIG. 7. Once full separation had been obtained, no more water spray was utilized. The water spray from the nozzle was manually played back and forth across the entire bushing bottom plate to quickly obtain fiber separation at each individual tip.

I claim:

1. A method of establishing filament flow from a bushing plate having tips having a plurality of orifices therein which comprises:
   (a) flowing glass from a plurality of orifices in a bushing tip as a single fiber;
   (b) directing a gaseous fluid into contact with said bushing plate;
   (c) simultaneously directing a cooling liquid into contact with the tips of said bushing plate to cause said single filament to separate into individual filaments issuing from each of said orifices; and,
   (d) discontinuing directing said cooling fluid into contact with the tips of said bushing while continuing to direct said gaseous fluid into contact with said bushing plate.

2. The method of claim 1 in which said cooling liquid is selected from the group consisting of water, aqueous diethylene glycol, and glycerine and said gaseous fluid is selected from the group consisting of air, carbon dioxide and nitrogen.

3. The method of claim 1 in which said cooling liquid is selected from the group consisting of refrigerated carbon dioxide, refrigerated nitrogen, and refrigerated air.

4. The method of claim 1 in which said tips contain from about two to about seven orifices.

5. In a method of making glass filaments from a body of molten glass confined above a bushing base plate, said base plate having a plurality of individual tips depending therefrom and each tip having a plurality of spaced orifices therein, said orifices of each said tip being so closely spaced from one another as to normally flood across the tip to form a single merged stream of molten glass issuing from all of the orifices at each individual tip, the improvement comprising directing a stream of liquid at the tips to impinge directly upon the merged stream of glass issuing therefrom, the liquid stream cooling the merged glass stream sufficiently to cause it to separate into individual molten glass cones each located at its own orifice, and thereafter drawing a glass filament from each cone.

6. In a method of starting a flooded glass filament bushing base plate, the base plate having a plurality of transversely and longitudinally spaced tips, each of which is provided with a plurality of individual orifices so closely spaced as to flood with the molten glass from the individual orifices of each tip merging into a single stream substantially covering the lower face of the tip, the improvement comprising separately but simultaneously impinging a jet of liquid and a flow of gas on the single merged stream at each tip for a period of time sufficient to separate the merged single stream into individual cones issuing from each orifice of the tip, and thereafter stopping the liquid impingement while continuing the flow of gas against the individual cones while concurrently drawing a filament from each cone.

7. A method of making glass filaments comprising drawing filaments from a plurality of tips, each tip having a plurality of orifices therein, while directing air upwardly toward the tips to normally prevent flooding from orifice-to-orifice at the tip, and, in the event of flooding of any tip, directing a stream of water toward the flooded tip for a period of time sufficient to separate the flooded glass of the flood tip into individual filaments which can be drawn from the individual orifices, thereby reinstating the drawing of a filament from each orifice of the previously flooded tip.

8. A method of starting operation of a glass filament bushing, the base plate of which has a plurality of tips each provided with a plurality of orifices, comprising the steps of flooding the base plate with glass issuing from each tip as a single stream in which the glass streams from the tip orifices merge into a composite glass filament, directing a water spray on each composite glass filament to cool the same sufficiently to effect separation of the composite filament into separate cones located in each orifice, terminating the water spray once separation is effected and thereafter drawing a filament from each cone while directing cooling air upwardly at each cone so that the cone is stabilized and filament drawing can be continued.

9. The method of decreasing bead-down time in a flooded glass filament bushing having an orificed bushing base plate, comprising merging together the molten glass from separate groups of orifices, drawing composite filaments from each of said groups of orifices, spraying water on the composite filaments adjacent the base plate to separate the composite filaments into their component filaments, each such filament being individual to one orifice, and drawing the individual filaments from the orifices.

10. The method of decreasing bead-down time in a glass filament bushing having a bushing base plate provided with isolated, individual tips, each tip having a plurality of orifices therethrough, said orifices being so closely spaced as to normally flood, comprising flooding the base plate to form a composite filament at each tip by merging together the molten glass issuing from the orifices of said tip, quenching the composite filament at each tip with liquid only to the extent necessary to separate the composite filaments into their component filaments, each such filament being individual to one orifice, and drawing individual filaments from the orifices.

* * * * *